United States Patent [19]
Akin et al.

[11] 3,968,258
[45] July 6, 1976

[54] PROCESS FOR THE PRODUCTION OF HIGH-PROTEIN PASTA UTILIZING DRIED YEAST AND THE RESULTING PRODUCT

[75] Inventors: Cavit Akin, Warrenville; Philip George Schnell, Wheaton, all of Ill.

[73] Assignee: Standard Oil Company, Chicago, Ill.

[22] Filed: June 9, 1975

[21] Appl. No.: 584,898

[52] U.S. Cl. .................................. 426/62; 426/557
[51] Int. Cl.² ............................................ A23L 1/16
[58] Field of Search .................. 426/19, 21, 557, 62

[56] References Cited
UNITED STATES PATENTS

| | | | |
|---|---|---|---|
| 2,677,613 | 5/1954 | Sheah | 426/19 |
| 3,574,634 | 4/1971 | Singer | 426/62 |
| 3,615,677 | 10/1971 | Aubel | 426/72 |

*Primary Examiner*—Raymond N. Jones
*Attorney, Agent, or Firm*—Werten F. W. Bellamy; Arthur G. Gilkes; William T. McClain

[57] ABSTRACT

Yeast or a mixture of yeast and soy protein containing material is incorporated into pasta formulations resulting in pasta products having high protein and nutritional value with improved taste, texture and cooking properties.

17 Claims, No Drawings

PROCESS FOR THE PRODUCTION OF HIGH-PROTEIN PASTA UTILIZING DRIED YEAST AND THE RESULTING PRODUCT

BACKGROUND OF THE INVENTION

This invention relates generally to the incorporation of yeast or a mixture of yeast and soy protein containing material into pasta formulations. More specifically, by the addition of these protein containing materials to pasta formulations, products having high protein levels and improved nutritional value are obtained. Additionally, the protein fortified pasta products have improved taste, texture and cooking properties.

In recent years much attention has been directed toward the development of new sources of protein which can be incorporated in foods or food additives suitable for human consumption. Rapid increases in world population have made the continued dependence on traditional sources of protein highly impractical. Moreover, the supply of protein from typical sources of protein, such as animal meat and certain vegetables, is inadequate to provide balanced diets sufficient to satisfy the needs of humans throughout the world.

In order to address this mounting problem, the food industry has been making attempts to increase the nutritional quality of pasta products through the addition of proteinaceous materials thereto. In past years, milk and eggs have been used as the proteinaceous material to provide the source of protein in certain types of pasta products. More recently, soy bean flour or soy protein isolates and concentrates have been suggested as the protein source. However, the addition of soy bean proteins to pasta formulations result in the production of pasta products characterized by light brown to a red-brown color and light beany taste. These characteristic features render the pasta product unattractive in terms of appearance as well as taste. The grayish-brown color gives a "dirty" appearance to the pasta product. The use of soy bean proteins suffers from the further disadvantage in that some soluble protein loss occurs when the pasta is cooked in water. Thus the initial high protein level of the dry pasta is significantly reduced. Surprisingly, we have discovered that the addition of yeast to the pasta formulation along with soy bean protein eliminates the disadvantages mentioned above in the use of soy bean protein alone. Thus the addition of yeast facilitates the production of high protein pasta products. Further, we have found that the addition of yeast alone to pasta formulations enables the production of pasta products with desirable nutritional, flavor, texture and cooking qualities.

SUMMARY OF THE INVENTION

According to this invention, there is provided a process for producing pasta having high protein levels and improved nutritional value. More specifically, we have found that by the addition of yeast alone or a mixture of yeast and soy bean material to pasta products such as macaroni, noodles, vermicelli, and spaghetti, enables the production of pasta formulations with a higher nutritional value, improved taste and cooking properties. We have discovered that the addition of yeast, in a percentage amount of from about 1 to about 16 percent, to pasta formulations on a dry flour weight basis or in conjunction with from about 6.25 to 12% soy flour enables the production of pasta formulations having highly desirable properties. Particularly, we have found that when the percentage amount of yeast, based on the dry weight of the flour present in the pasta formulation is within the range of 3 to 12, sprayed dried yeast (1) holds the texture of macaroni together; (2) reduces the amount of solubles lost during cooking; and (3) increases lysine, protein and vitamin content of the pasta, thereby achieving a pasta product having better nutritive value. Further, the addition of yeast in the percentage amount mentioned above imparts retort stability to the macaroni which can be used in canned foods. Additionally, yeast imparts freeze-thaw-heat-freeze or cool cycle stability to the macaroni texture.

By practicing the process of this invention, therefore, one can prepare a pasta formulation containing yeast alone or a yeast-soy bean mixture having high protein and nutritional value with improved taste, texture and cooking properties.

DESCRIPTION OF THE PREFERRED EMBODIMENTS

The process of this invention is especially designed to provide a method for improving texture, taste and cooking properties along with protein and nutritional value to mixtures of (1) pasta and yeast or (2) pasta, yeast and plant protein wherein the yeast were grown by known commercial fermentation processes.

By way of illustration, yeasts such as those listed in Table I are suitable materials in the practice of this invention.

Table I

| Suitable Yeasts |
| --- |
| Candida curvata |
| Candida lipolytica |
| Candida pulcherima |
| Candida utilis |
| Hansenula anomala |
| Oidium lactis |
| Saccharomyces carlsbergensis |
| Saccharomyces cerevisiae |
| Saccharomyces fragilis |
| Trichosporon cutaneum |

The use of *Candida utilis*, *Saccharomyces cerevisiae*, *Saccharomyces fragilis*, or *Saccharomyces carlsbergensis* is the preferred yeast material incorporated in the pasta formulations of this invention, because each is considered by the U.S. Food and Drug Administration to be suitable for use in food products.

The soy protein containing material which can be employed in accordance with this invention is selected from the group consisting of soy flour, defatted soy flour, soy protein isolates and concentrates, and soy flakes.

In general, the process for preparing pasta such as Semolina or blends thereof, comprises mixing flour, and liquid, such as water, to form a pasta dough which is thereafter shaped and dried, wherein the improvement comprises incorporating a protein-containing material selected from the group consisting of (1) yeast and (2) yeast and plant protein mixture, into said pasta dough. The yeast material selected from the abovesaid preferred yeasts, is added in an amount of from about 1 to about 16 percent of the weight of flour used to make the pasta dough. The presence of yeast in the amounts of 1.5, 3.0, 5.0 or 9.0 percent is especially preferred. When the above said soy protein containing material is added to the pasta formulations of this invention, it is present in an amount ranging from 6.25 to 12 percent based on the dry weight of flour used to make the pasta dough. A pasta formulation containing *Candida utilis* and soy flour in the amount of 6.25 percent each is especially preferred. The pasta formulations of this invention can be shaped in the form of macaroni, spaghetti, vermicelli and noodles. The type of macaroni products derived by rolling, stamping, or cutting procedures, such as the products generally known as "Pasta Bologna" as well as ravioli products are herein contemplated within the scope of this invention.

The increase in Torula yeast in the macaroni up to 9% increased the egg yolk color of the dry and cooked macaroni and gave the cooked macaroni a slight meat taste. Moreover, the addition of Torula yeast organoleptically improved the bite of the cooked macaroni on longer cooking and did not interfere with the tomato flavor when in tomato sauce. However, in the presence of cheese sauce, the Torula yeast gave a slight cheddar enhancement and meaty flavor.

Additionally, we have found, as shown in Table 3, that the amount of protein loss from cooked macaroni decreases with increased amounts of Torula yeast whereas the amount of nucleic acid in the cook water is increased.

Example I

A group of macaroni products were prepared by using 1.5%, 3%, 5% and 9% Torula yeast (see Table No. 1). All of these yeast added macaroni products had as good flavor as the non-yeast control. The cooked texture of the yeast added samples was better than the texture of the yeast free control sample. The presence of yeast did not adversely affect the color or the taste when tomato sauce was used in cooking. An egg macaroni color and the egg flavor were generated at increasing levels with increased yeast content.

Example II

A group of macaroni products were prepared by using soy bean and yeast mixture (see Table No. 2). When 12.5% defatted soy flour is used the color of the new macaroni was gray, and the cooked macaroni was slightly gray, the texture was mushy and the taste was poor. As the soy flour was replaced with incrementally added yeast, both the raw and the cooked macaroni quality improved with the increased amount of yeast in the formulation. The best color, taste, and texture was obtained when 6.25% soy flour and 6.25% yeast were used in the formulation. Presence of yeast eliminated the raw flour taste, and reversed the negative effects of soy flour.

Table 1

EFFECTS OF VARYING LEVELS OF TORUTEIN ON THE CHARACTERISTICS OF MACARONI

| Property | Control 100% Semolina | 98.5% Semolina 1.5% Torutein* | Sample 97.0% Semolina 3% Torutein | 95% Semolina 5% Torutein | 91% Semolina 9% Torutein |
|---|---|---|---|---|---|
| Dry Color | Light yellow | Light yellow | Light yellow, slight egg yolk red | Light yellow, egg yolk color | Light yellow, egg yolk color |
| Cooked Color | Cream | Cream | Cream, slight egg yolk red | Cream, slight egg yolk red, opaque | Cream, slight egg yolk red, opaque |
| Cooked Flavor | Cereal | Very slight meaty | Slight meaty | Slight meaty | Slight meaty |
| Cooked Texture | | | | | |
| 10 minutes | Elastic | Elastic | Elastic | Elastic | Elastic |
| 20 minutes | Slightly elastic | Slightly elastic | Elastic | Elastic | Elastic |
| Hydration gm/water/100 gm macaroni | | | | | |
| 10 minutes | 131 | 142 | 138 | 144 | 145 |
| 20 minutes | 225 | 212 | 221 | 223 | 230 |
| Color with Tomato Sauce | Good | Good | Good | Good | Good |
| Flavor with Tomato Sauce | Good | Good | Good | Good | Good |
| Flavor with Cheese Sauce | Good | Good | Slight meaty Slight intensify cheddar | Slight meaty Slight intensify cheddar | Slight meaty Slight intensify cheddar |

*Torutein refers to Amoco Torula dried yeast grown on ethanol, which has the trade name Protam-10.
**The term "slight" indicates a lower intensity than the term "light" when appearing in Tables 1 and 2.

EXAMPLES

The following examples are illustrative, without implied limitation, of our invention.

Table 2

EFFECT OF YEAST-SOY COMBINATIONS ON THE CHARACTERISTICS OF MACARONI

| Property | Control 100% Semolina | 87.5% Semolina 12.5% Soy Flour** | Sample 87.5% Semolina 11.0% Soy Flour 1.5% Torutein* | 87.5% Semolina 9.5% Soy Flour 3.0% Torutein | 87.5% Semolina 6.25% Soy Flour 6.25% Torutein |
|---|---|---|---|---|---|
| Dry Color | Light yellow | Dirty, light brown | Dirty, light brown | Yellow light brown | Egg yolk red, slight brown |
| Cooked Color | Cream | Dirty, slight brown | Dirty, slight red brown | Dirty, slight red brown | Egg yolk red, very slight brown |
| Cooked Flavor | Cereal | Cereal, slight soy | Cereal, slight soy | Cereal, slight soy | Slight meaty, slight cereal |
| Cooked Texture | | | | | |
| 10 minutes | Elastic | Mushy | Mushy | Slightly mushy | Slightly elastic |
| 20 minutes | Slightly | Mushy | Mushy | Slightly mushy | Slightly elastic |

Table 2-continued
EFFECT OF YEAST-SOY COMBINATIONS ON THE CHARACTERISTICS OF MACARONI

| Property | Control 100% Semolina | 87.5% Semolina 12.5% Soy Flour** | Sample 87.5% Semolina 11.0% Soy Flour 1.5% Torutein* | 87.5% Semolina 9.5% Soy Flour 3.0% Torutein | 87.5% Semolina 6.25% Soy Flour 6.25% Torutein |
|---|---|---|---|---|---|
| | elastic | | | | |
| Hydration gm water/100 gm macaroni | | | | | |
| 10 minutes | 131 | 151 | 137 | 140 | 134 |
| 20 minutes | 225 | 203 | 194 | 217 | 219 |
| Color with Tomato Sauce | Good | Dirty | Slight dirty | Slight dirty | Good |
| Flavor with Tomato Sauce | Good | Good | Good | Good | Good |
| Flavor with Cheese Sauce | Good | Grassy, soy | Grassy, soy | Grassy, slight meaty | Slight meaty, enhanced cheddar |

*Torutein refers to Amoco Torula dried yeast grown on ethanol, which has the trade name Protam-10.
**Soy Flour - Central Soya's defatted soyflour Soyafluff 200W was used.

Table 3
EFFECT OF TORUTEIN ADDITION ON THE PROTEIN AND NUCLEIC ACID LOSS OF COOKED MACARONI

| Sample | Protein Loss (mg/100 gm macaroni) | Nucleic Acid Loss (mg/100 gm macaroni) |
|---|---|---|
| Control, 100% Semolina | 23 | 0.5 |
| 98.5% Semolina 1.5% Torutein* | 22 | 8 |
| 97.0% Semolina 3.0% Torutein | 15 | 12 |
| 95.0% Semolina 5.0% Torutein | 8 | 14 |
| 87.5% Semolina 6.25% Torutein 6.25% Soy Flour | 45 | 17 |
| 87.5% Semolina 3.0% Torutein 9.5% Soy Flour | 68 | 12 |
| 87.5% Semolina 1.5% Torutein 11.0% Soy Flour | 83 | 11 |
| 87.5% Semolina 12.5% Soy Flour | 89 | 10 |

*Torutein refers to Amoco Torula dried yeast grown on ethanol, which has the trade name Protam-10.

The improvement of the nutritional quality of the yeast added macaroni is illustrated in Tables 1, 2 and 4.

TABLE 4
Nutrient Composition of Macaroni - Enriched 100 g/Sample

| | Without Yeast* | With 3% Yeast* | % Change With 3% Yeast |
|---|---|---|---|
| Calories kcal | 362.8 | 348.5 | |
| Protein g | 12.5 | 13.2 | +5.6 |
| Fat g | 1.2 | 1.3 | +8.3 |
| Carbohydrate g | 75.5 | 71.0 | −6.0 |
| Ash g | 0.7 | 0.9 | +29.0 |
| Minerals: | | | |
| Calcium mg | 27 | 26 | −4 |
| Phosphorus mg | 162 | 214 | +32.0 |
| Iron mg | 2.9 | 3.0 | +3.0 |
| Sodium mg | 2.0 | 5.0 | +150.0 |
| Potassium mg | 197 | 252 | +28.0 |
| Vitamins: | | | |
| Choline mg | 0 | 23.4 | Y |
| Thiamine mg | 0.88 | 0.84 | −5.0 |
| Riboflavin mg | 0.37 | 0.48 | +30.0 |
| Niacin mg | 6.0 | 7.2 | +20.0 |
| Vit. B12 μg | — | 0.000012 | Y |
| Vit. B6 μg | — | 0.25 | Y |
| Pantothenic Acid mg | — | 0.28 | Y |
| Folic Acid μg | — | 0.012 | Y |

— = Data not available.
Y = Total contribution by yeast
INCREASE IN ESSENTIAL AMINO ACIDS WITH 3% YEAST.

Lysine 7%
Threonine 3%

*Protam-10 (Torutein)

TABLE 5
Nutrient Composition of Macaroni - Nonenriched 100 g/Sample

| | Without Yeast | With 3% Yeast* | % Change With 3% Yeast |
|---|---|---|---|
| Calories kcal | 362.8 | 348.5 | |
| Protein g | 12.5 | 13.2 | +5.6 |
| Fat g | 1.2 | 1.3 | +8.3 |
| Carbohydrate g | 75.5 | 71.0 | −6.0 |
| Ash g | 0.7 | 0.9 | +29.0 |
| Minerals: | | | |
| Calcium mg | 27 | 26 | −4.0 |
| Phosphorus mg | 162 | 214 | +32.0 |
| Iron mg | 1.3 | 1.5 | +15.0 |
| Sodium mg | 2.0 | 5.0 | +150.0 |
| Potassium mg | 197 | 252 | +28.0 |
| Vitamins: | | | |
| Choline mg | — | 23.4 | Y |
| Thiamine mg | 0.09 | 0.11 | +22.0 |
| Riboflavin mg | 0.06 | 0.19 | +217.0 |
| Niacin mg | 1.7 | 3.2 | +88.0 |
| Vit. B12 μg | — | 0.000012 | Y |
| Vit. B6 μg | — | 0.25 | Y |
| Pantothenic Acid mg | — | 0.28 | Y |
| Folic Acid μg | — | 0.12 | Y |

— = Data not available
Y = Total contribution by yeast
INCREASE IN ESSENTIAL AMINO ACIDS WITH 3% YEAST Lysine 7%
Threonine 3%

*Protam-10 (Torutein)

The many advantages in the use of yeast in the preparation of macaroni and other pasta products include lower soluble solids loss, resistance to processing at high temperatures for long periods of time required in the preparation of meat-pasta products, and flavor stability. Yeast imparts elasticity to the pasta and does not impart undesirable color. It has been found that by increasing the concentration of yeast above five (5) percent, of the dried flour weight, contributes an egg color and flavor which is very appealing in the pasta products. Additionally, yeast functions to clarify and remove starch flavor and thereby avoids interfering with the flavor of other products with which it is mixed.

The nutritional advantages of the yeast are also significant since most pasta products are now enriched and yeast addition will reduce this requirement.

We claim:

1. In a process of preparing pasta wherein flour and liquid are mixed to form a pasta dough which is thereafter shaped and dried, the improvement which comprises incorporating a protein-containing material selected from the group consisting of (1) Torutein dried yeast and (2) Torutein dried yeast and plant protein mixture, into said pasta dough; said yeast being an amount sufficient to hold the texture of the pasta together, reduce the amount of solubles lost during cooking and impart retort stability.

2. The improvement in accordance with claim 1 wherein the said protein-containing material is a Torutein dried yeast.

3. The improvement in accordance with claim 1 wherein the Torutein dried yeast is selected from the group consisting of *Candida utilis, Saccharomyces carlsbergensis, Saccharomyces cerevisiae,* and *Saccharomyces fragilis.*

4. The improvement in accordance with claim 3 wherein the Torutein dried yeast is *Candida utilis.*

5. The improvement in accordance with claim 2 wherein the amount of Torutein dried yeast is from about 1 to about 16 percent of the weight of flour used to make the said pasta dough.

6. The improvement in accordance with claim 5 wherein the Torutein dried yeast is *Candida utilis,* the pasta is macaroni, and the percentage amount of said yeast is selected from the group consisting of 1.5, 3, 5 and 9.

7. The improvement in accordance with claim 1 wherein the pasta is selected from the group consisting of macaroni, spaghetti, vermicelli and noodles.

8. The improvement in accordance with claim 1 wherein the said protein-containing material is a mixture of Torutein dried yeast and plant protein.

9. The improvement in accordance with claim 8 wherein the Torutein dried yeast is selected from the group consisting of *Candida utilis, saccharomyces carlsbergensis, Saccharomyces cerevisiae* and *Saccharomyces fragilis;* and the plant protein is selected from the group consisting of soy flour, defatted soy flour, soy flakes, soy protein isolates and soy protein concentrates.

10. The improvement in accordance with claim 8 wherein the amount of the Torutein dried yeast and plant protein component, based on the dry weight of flour used to make said pasta dough, is about 1 to about 16 percent and about 6.25 to about 12 percent, respectively.

11. The improvement in accordance with claim 8 wherein the pasta is selected from the group consisting of macaroni, spaghetti, vermicelli and noodles.

12. The improvement in accordance with claim 9 wherein the pasta is macaroni.

13. The improvement in accordance with claim 12 wherein the Torutein dried yeast is *Candida utilis* and the plant protein is soy flour.

14. The improvement in accordance with claim 13 wherein the amount of *Candida utilis* and soy flour is 6.25 percent of each.

15. The pasta product prepared by the process of claim 1.

16. The pasta product prepared by the process of claim 6.

17. The pasta product prepared by the process of claim 14.

* * * * *